United States Patent [19]

Gora et al.

[11] Patent Number: 5,264,156
[45] Date of Patent: Nov. 23, 1993

[54] RESISTOR COMPOSITION FOR PRODUCING THICK FILM RESISTORS

[75] Inventors: Frieder Gora, Aschaffenburg; Karlheinz Guldner, Waldbüttelbrunn; Christina Modes, Frankfurt, all of Fed. Rep. of Germany

[73] Assignee: W. C. Heraeus GmbH, Hanau, Fed. Rep. of Germany

[21] Appl. No.: 934,183

[22] Filed: Aug. 21, 1992

[30] Foreign Application Priority Data

Aug. 22, 1991 [DE] Fed. Rep. of Germany ....... 4127845

[51] Int. Cl.$^5$ .............................................. H01B 1/00
[52] U.S. Cl. ................................... 252/518; 252/519; 252/521; 106/1.05; 106/1.22; 501/74; 501/153
[58] Field of Search ....................... 252/518, 519, 521; 106/1.05, 1.22; 501/74, 153, 154

[56] References Cited

U.S. PATENT DOCUMENTS 4,302,362 11/1981 Hoffman et al. ..................... 252/520
5,069,824 12/1991 Blanke et al. ....................... 252/518

FOREIGN PATENT DOCUMENTS 0013977 8/1980 European Pat. Off. .
0110167 6/1984 European Pat. Off. .
0395799 11/1990 European Pat. Off. .
3914844 11/1990 Fed. Rep. of Germany .
3941283 1/1991 Fed. Rep. of Germany .

OTHER PUBLICATIONS

Hawley, *Condensed Chemical Dictionary*, 8th Ed., p. 110, definition of acronym BET; Van Nostrand Reinhold, N.Y., 1971.

Nils Wiberg, *Lehrbuch der Anorganischen Chemie* [Manual of Inorganic Chemistry], 100th revised edition, pp. 768-778; published by Walter de Gruyter, Berlin and N.Y., 1985.

Patent Abstracts of Japan vol. 13, No. 362 (C-625) Aug. 14, 1989.

Primary Examiner—Paul Lieberman
Assistant Examiner—M. Kopec
Attorney, Agent, or Firm—Frishauf, Holtz, Goodman & Woodward

[57] ABSTRACT

A resistor composition comprising a pyrochlore-related oxide a glass frit and, anorthite as a finely-divided filler. The resistor composition exhibits high tolerance in respect to firing temperatures. Thick film resistors obtained therefrom by firing on, for example, aluminum oxide substrates, have relatively uniform resistance values, even with inconsistent firing conditions, and have high stability of resistance following laser trimming.

21 Claims, No Drawings

RESISTOR COMPOSITION FOR PRODUCING THICK FILM RESISTORS

BACKGROUND OF THE INVENTION

1. Field of the Invention

The present invention relates to a resistor composition for producing thick film resistors containing (a) a pyrochlore-related oxide of the formula $M_xM'_y(Pb,Bi)_{2-x-y}Ru_2O_{7-z}$, where M=copper and/or silver, M'=calcium, strontium and/or barium, $0 \leq x \leq 0.6$, $0.1 \leq y \leq 1.0$ and $0.1 \leq z \leq 1.0$, and (b) a glass frit.

2. Background Information

German Patent Disclosure DE 39 14 844 A1, (inventors: Blanke et al., assignee: Heraeus GmbH) U.S. Pat. No. 5,069,824 is a family member of DE 39 14 844 A1; the entire disclosure of U.S. Pat. No. 5,069,824 is incorporated by reference), relates to electrically conductive pyrochlore-related oxides of the general formula $M_xM'_y(Pb,Bi)_{2-x-y}Ru_2O_{7-z}$, where M=copper and/or silver, M'=calcium, strontium and/or barium, $0 \leq x \leq 0.6$, $0.1 \leq y \leq 1.0$ and $0.1 \leq z \leq 1.0$, and to resistor pastes consisting of these oxides, glass frits as dielectric inorganic binders and organic media as liquid vehicles. Thick film resistors which are produced from the resistor pastes of DE 39 14 944 by printing on, for example, aluminum oxide substrates and firing, are distinguished by low HTCR, CTCR and $\Delta$ TCR values (HTCR=hot temperature coefficient of resistance, CTCR=cold temperature coefficient of resistance, $\Delta$ TCR=HTCR−CTCR). However, it has been shown that these values are subject to comparatively large fluctuations and are particularly affected by the firing temperature.

Resistor pastes for thick film resistors are proposed in EP Patent Disclosure EP 0 013 977 B1 (inventor: Hoffman et al., assignee: DuPont) (EP 0 013 977 E1 is a family member of U.S. Pat. No. 4,302,362, the entire disclosure of U.S. Pat. No. 4,302,362 is incorporated y reference herein) which, in addition to an organic vehicle, essentially consist of 20 to 75 parts by weight of a pyrochlore compound of the general formula $(M_xBi_{2-x})(M'_yM''_{2-y})O_{7-z}$, where M=yttrium, thallium, indium, cadmium, lead, copper, rare earth metals, M'=platinum, titanium, chromium, rhodium, antimony, M''=ruthenium and/or iridium, x=0-2, y=0-0.5 and z=0-1, of 12-75 parts by weight of a glass binder and 2-30 parts by weight of a temperature-resistant finely divided filler. The filler has a thermal expansion coefficient of $40-60 \times 10^{-7}/°C.$, a particle size of 0.1 to 3 micrometers and is preferably composed of zircon or mullite. The resistor pastes are printed on dielectric substrates and are fired at 850° C. (peak temperature) in air. As a result of the addition of the filler, the thick film resistors obtained in this manner show improved stability, i.e., in contrast to the resistance drift observed elsewhere, the resistance values remain relatively constant following mechanical stresses, such as occur, for example, during trimming of the resistor by means of a laser beam as a result of the sudden change in temperature. Resistor trimming is defined as the exact setting of the resistance value following firing by abrading resistor material until the desired resistance value has been obtained ("Elektronik-Lexikon", edited by Ernst Baier, 2nd. ed., 688, Stuttgart, Franck'sche Verlagshandlung, 1982).

SUMMARY OF THE INVENTION

It is an object of the present invention to provide a resistor composition of the above-characterized type by means of which it is possible to produce thick film resistors with relatively uniform resistance values even under inconsistent firing conditions, in particular with deviations of the peak temperature.

The resistor composition by means of which this object is attained is distinguished in accordance with the present invention in that it contains 10-80 weight % of 15-85 weight % of a glass frit and 5-20 weight % of finely-divided anorthite. More specifically the present invention concerns a resistor composition for producing a thick film resistor comprising (a) 10 to 80 weight % of a pyrochlore-related oxide of the formula $M_xM'_y(Pb,Bi)_{2-x-y}Ru_2O_{7-z}$, where M is one or more of a metal selected from the group consisting of copper and silver, M' is one or more of a Group IIA element selected from the group consisting of calcium, strontium and barium, $0 \leq x \leq 0.6$, $0.1 \leq y \leq 0.1$ and $0.1 \leq z \leq 1.0$, (b) 15 to 85 weight % of a glass frit and (c) 5 to 20 weight % of finely divided anorthite.

A resistor composition of 10-45 weight % of pyrochlore-related oxide, 50-85 weight % of glass frit and 5-15 weight % of finely divided anorthite is preferred.

DETAILED DESCRIPTION OF THE INVENTION

The resistor composition of the present invention has proven to be particularly effective, if the anorthite has a mean particle size of 0.5-1 micrometer and a specific surface of approximately 10 to 20 m²/g, determined in accordance with the BET (Brunauer, Emmett, Teller) method. Anorthite is a calcium-aluminum-silicate of the formula $CaO.Al_2O_3.2SiO_2$. Synthetic anorthite is preferred for the resistor composition of the present invention.

For producing high-ohmic thick film resistors (approximately 1-100M$\Omega$) with positive HTCR values, it has been shown to be advantageous if the pyrochlore-related oxide corresponds to the general formula where x=0, $0.4 \leq y \leq 1.0$ and $0.1 \leq z \leq 1.0$, and the stoichiometric ratio of lead to bismuth is between 1 and 2.

As known per se (see EP 0 110 167 B1, for example), the pyrochlore-related oxide can be produced by a solid body reaction or by a reaction in the liquid phase. Use of the corresponding metals, metal oxides, metal carbonates or mixtures thereof in powder form as the initial materials and annealing them in air at approximately 700°-1000° C. has proven to be particularly effective.

The glass frit which, together with the pyrochlore-related oxide and the finely-divided anorthite, constitutes the resistor composition in accordance with the present invention. The glass frits for the present invention can be glass frits which are used in thick film technology for resistor compositions which can be fired. However, lead aluminosilicate glass frits and lead aluminoborosilicate glass frits have proven themselves to be particularly advantageous, preferably those of 50-70 weight % of PbO, 25-35 weight % of $SiO_2$, 1-10 weight % of $Al_2O_3$ and 1-10 weight % of $B_2O_3$.

Normally, the resistor composition is used together with an organic medium as the liquid vehicle and in this case is available as a paste which can then be applied to the dielectric substrate by means of a screen-printing process, for example. The liquid vehicle most often consists of a solution of an organic polymer, such as acrylic resin or ethyl cellulose, in an organic solvent, for example terpineol or butylcarbitol (butyldiglycolacetate). The resistor paste is produced in a known manner by mixing its components together. After printing the paste on the substrates consisting, for example, of aluminum oxide, and drying the paste by evaporation of the solvent, the printed substrates are fired at approximately 700°-900° C. (peak temperature) in air.

Surprisingly, the presence of the finely-divided anorthite in the resistor composition results in a high tolerance in respect to the firing conditions, in particular the firing temperature, especially the peak temperature. Even with fluctuations of the firing conditions, such as occur in actual use, thick film resistors with relatively uniform resistance values are obtained. The anorthite causes increased viscosity of the glass melt and, on account of this, dimensional stability of the resistor composition during firing and homogeneous distribution of the pyrochlore-related oxide in the glass phase.

In addition, the anorthite increases the thixotrophy of the resistor composition which, together with the liquid carrier, is present in paste form and thus improves the printing properties of the paste; the desired film thickness can be obtained with increased accuracy when printing the paste on the substrates.

Furthermore, the thick film resistors produced from the anorthite-containing resistor composition of the present invention are further distinguished by high stability of the resistance following resistor trimming by laser beam. The continuing change of the resistance, defined as resistance drift, following laser trimming is small. Presumably the expansion coefficients of the fired resistance film and of the substrate have been adapted to each other because of the anorthite content in such a way, that the formation and spread of microcracks, which otherwise occur because of temperature stress during laser trimming, for all practical purposes does not occur.

For the purpose of a more detailed description, the preparation of anorthite-containing resistor pastes and—for comparison purposes—of similarly composed resistor pastes which however, do not contain anorthite, and the production of thick film resistors will be described by means of the examples below.

EXAMPLES

For characterization of the resistor composition in accordance with the present invention, for the pastes in accordance with the following examples, the sheet resistance $R°_f[M\Omega/\square]$ and the temperature coefficient of resistance are determined as a function of the firing temperature, the precision of the film thicknesses and the stability of resistance following resistor trimming of the thick film resistors.

EXAMPLE 1 (COMPARISON EXAMPLE)

A mixture of 29 weight % of $Ba_{0.6}Cu_{0.3}Pb_{0.6}Bi_{0.5}Ru_2O_{7-z}$ and 71 weight % of a glass frit of 62 weight % of PbO, 29 weight % of $SiO_2$, 6 weight % of $Al_2O_3$ and 3 weight % of CdO, having a mean particle size of 4 micrometers, and a 10% solution of ethyl cellulose in butylcarbitol in a ratio of 3:1 are worked into a paste on a cylinder mill. The paste is printed through a special steel mesh (200 mesh) on $Al_2O_3$ substrates of a size of 50×50×0.63 mm dried in air for 10 minutes at 150° C. and then fired in a continuous furnace for 10 minutes at peak temperatures of 840° C., 850° C., 860° C. (total dwell time in the furnace one hour). There is a total of 16 individual thick film resistors of a size of 1.5×1.5 mm on each substrate.

EXAMPLE 2

A mixture of 31 weight % of $Ba_{0.6}Cu_{0.3}Pb_{0.6}Bi_{0.5}Ru_2O_{7-z}$, 60.4 weight % of a glass frit of 62 weight % of PbO, 29 weight % of $SiO_2$, 6 weight % of $Al_2O_3$ and 3 weight % of CdO, having a mean particle size of 4 micrometers, and 8.6 weight % of anorthite with a mean particle size of 0.9 micrometers and a BET surface of 13.5 m$^2$/g, and a 10 weight % solution of ethyl cellulose in butylcarbitol in a ratio of 3:1 are worked into a paste on a cylinder mill. The paste is printed through a special steel mesh (200 mesh) on $Al_2O_3$ substrates of a size of 50×50×0.63 mm, dried in air for 10 minutes at 150° C. and then fired in a continuous furnace for 10 minutes at peak temperatures of 840° C., 850° C., 860° C. (total dwell time in the furnace one hour). There is a total of 16 individual thick film resistors of a size of 1.5×1.5 mm on each substrate.

EXAMPLES 3 TO 13

Mixtures of pyrochlore-related oxide and glass frit (Comparison Examples, namely Examples 3, 5, 7, 10 and 12) and of pyrochlore-related oxide, glass frit and anorthite (mean particle size of 0.9 micrometer and BET surface of 13.5 m$^2$/g) (Examples 4, 6, 8, 9, 11 and 13) of the compositions recited in Table I are worked into pastes in the manner described in Examples 1 and 2. The pastes in accordance with Examples 3 to 8 are printed through a special steel mesh (200 mesh) on $Al_2O_3$ substrates of a size of 50×50×0.63 mm, dried in air for 10 minutes at 150° C. and then fired in a continuous furnace for 10 minutes at peak temperatures of 840° C., 850° C., 860° C. (total dwell time in the furnace one hour). There is a total of 16 individual thick film resistors of a size of 1.5×1.5 mm on each substrate.

TABLE I

| Example | Oxide (weight %) | | | Glass Frit (weight %) | | | Anorthite (weight %) |
|---|---|---|---|---|---|---|---|
| | A | B | C | I | II | III | |
| 1* | 29 | | | 71 | | | |
| 2 | 31 | | | 60.4 | — | | 8.6 |
| 3* | 25 | | | | 75 | | |
| 4 | 33 | | | | 60.8 | | 6.2 |
| 5* | | 22 | | | | 78 | |
| 6 | | 28 | | | | 60 | 12.0 |
| 7* | | | 21 | | | 79 | |
| 8 | | | 28 | | | 61.9 | 10.1 |
| 9 | 28 | | | 60.3 | | | 11.7 |
| 10* | | 22 | | | | 78 | |
| 11 | | 19 | | | | 73.8 | 7.2 |
| 12* | | | 21 | | | 79 | |
| 13 | | | 25 | | | 61.8 | 12.2 |

*Comparison

A = $Ba_{0.6}Cu_{0.3}Pb_{0.6}Bi_{0.5}Ru_2O_{7-z}$
B = $Ca_{0.8}Pb_{0.8}Bi_{0.4}Ru_2O_{7-z}$
C = $Ca_{0.85}Cu_{0.25}Pb_{0.5}Bi_{0.4}Ru_2O_{7-z}$
I = glass frit of 62 weight % of PbO, 29 weight % of $SiO_2$, 6 weight % of $Al_2O_3$ and 3 weight % of CdO
II = 57 weight % of PbO, 38 weight % of $SiO_2$, 5 weight % of $Al_2O_3$
III = glass frit of 63 weight % of PbO, 31 weight % of $SiO_2$, 4 weight % of of $Al_2O_3$ and 2 weight % of $B_2O_3$ Sheet Resistance and Thermal Coefficient of Resistance The sheet resistance $R°_f[M\Omega/\square]$, referring to a film thickness of 25 micrometers, and the thermal coefficient of resistance, also referring to a film thickness of 25 micrometers, in the range of +25° C. to +125° C., HTCR [ppm/K], of the thick film resistors produced in accordance with Examples 1 to 8 are shown in Table II. The anorthite-containing resistor pastes or the thick film resistors made therefrom are distinguished by increased tolerance in regard to fluctuations in the firing temperature (peak temperature) as shown by a comparison of the $R°_f$ and HTCR values.

Exactness of the Film Thickness

To provide a measurement of the exactness of the film thickness of the printed films, as well as the fired resistance films, the deviation of the sheet resistance of the 16 individual resistors of a substrate of $R°_f$, referring to $R°_f$, is determined, stated differently, $R_f^* - R°_f/R°_f$ wherein * stands for individual. The mean deviation is shown as variance [%] in Table II. As shown in Table II, the film thickness of the anorthite-containing films agree very well with each other, while they diverge to a greater extent in the anorthite-free films.

TABLE II

| Ex- | $R_f$ [MΩ/□] | | | HTCR [ppm/k] | | | Variance [%] |
|---|---|---|---|---|---|---|---|
| ample | 840° C. | 850° C. | 860° C. | 840° C. | 850° C. | 860° C. | |
| 1* | 3.95 | 1.65 | 0.77 | −77 | −42 | −4 | 7.3 |
| 2 | 0.98 | 0.94 | 0.94 | −64 | −54 | −33 | 4.59 |
| 3* | 0.66 | 0.42 | 0.22 | −5 | −25 | −38 | 10.20 |
| 4 | 1.11 | 1.08 | 1.02 | −88 | −82 | −74 | 2.70 |
| 5* | 0.70 | 0.89 | 1.16 | +124 | +101 | +49 | 24.70 |
| 6 | 0.76 | 0.76 | 0.80 | +51 | +47 | +47 | 2.54 |
| 7* | 1.72 | 2.15 | 2.80 | 0 | −27 | −82 | 21.72 |
| 8 | 0.82 | 0.88 | 0.97 | −55 | −60 | −74 | 2.54 |

*Comparison

Resistor Trimming and Stability of the Resistance

The pastes in accordance with Examples 1 and 9 to 13 are printed on $Al_2O_3$ substrates, dried and fired in the manner recited in Example 1, where the peak temperature is 850° C. There is a total of 8 thick film resistors of a size of 1×1 millimeters on each substrate. The sheet resistance $R°_f$, referring to a film thickness of 25 micrometers, of the thick film resistors is determined. Then resistor material is abraded from the thick film resistors by means of an Nd-YAG laser until the surface resistance $R_f = 1.5 R°_f$. The thick film resistors are then dipped for 5 seconds into a soldering bath (alloy of 62 weight % tin, 36 weight % lead and 2 weight % silver; 230° C.). To provide the measurement of the stability of the resistance, the difference between the sheet resistance $R_f$, measured after treatment in the soldering bath, and the surface resistance $R°_f$, referring to $R°_f$, $\Delta R/R°_f$ [%], is determined ($\Delta R/R°_f = R_f - R°_f/R°_f$). As shown in Table III, the thick film resistors made from the anorthite-containing resistor pastes have a clearly improved stability over those made from resistor pastes without anorthite.

TABLE III

| Example | $R_f$ [MΩ/□] | $\Delta R/R_f$ [%] |
|---|---|---|
| 1* | 2.47 | 4.03 |
| 9 | 1.62 | 0.88 |
| 10* | 0.58 | 2.83 |
| 11 | 1.25 | 0.03 |
| 12* | 2.33 | 0.60 |
| 13 | 0.18 | 0.05 |

*Comparison

Various changes and modifications may be made, and features described in connection with any one of the embodiments may be used with any of the others, within the scope of the inventive concept.

What is claimed is:
1. A resistor composition for producing a thick film resistor comprising
   (a) 10 to 80 weight % of a pyrochlore-related oxide of the formula $M_xM'_y(Pb,Bi)_{2-x-y}Ru_2O_{7-z}$, where M is one or more of a metal selected from the group consisting of copper and silver, M' is one or more of a Group IIA element selected from the group consisting of calcium, strontium and barium, $0 \leq x \leq 0.6$, $0.1 \leq y \leq 1.0$ and $0.1 \leq z \leq 1.0$,
   (b) 15 to 85 weight % of a glass frit and
   (c) 5 to 20 weight % of finely divided anorthite.
2. The resistor composition in accordance with claim 1, wherein the oxide is present in an amount of 10 to 45 weight %, the glass frit is present in an amount of 50 to 85 weight % and the finely divided anorthite is present in an amount of 5 to 15 weight %.
3. The resistor composition in accordance with claim 1, wherein the anorthite has a mean particle size of 0.5 to 1 micrometer.
4. The resistor composition in accordance with claim 1, wherein the anorthite has a BET surface of approximately 10 to 20 m²/g.
5. The resistor composition in accordance with claim 1, wherein the pyrochlore-related oxide is $Ba_{0.6}Cu_{0.3}Pb_{0.6}Bi_{0.5}Ru_2O_{7-z}$.
6. The resistor composition in accordance with claim 1, wherein the pyrochlore-related oxide is $Ca_{0.85}Cu_{0.25}Pb_{0.5}Bi_{0.4}Ru_2O_{7-z}$.
7. The resistor composition in accordance with claim 1, wherein $x=0$, $0.4 \leq y \leq 1.0$ and the stoichiometric ratio of lead to bismuth is between 1 and 2.
8. The resistor composition in accordance with claim 7, wherein the pyrochlore-related oxide is $Ca_{0.8}Pb_{0.8}Bi_{0.4}Ru_2O_{7-z}$.
9. The resistor composition in accordance with claim 1, wherein the glass frit is a lead aluminosilicate glass frit.
10. The resistor composition in accordance with claim 1, wherein the glass frit is a lead aluminoborosilicate glass frit.
11. The resistor composition in accordance with claim 10, wherein the lead aluminoborosilicate glass frit consists essentially of 50 to 70 weight % of PbO, 25 to 35 weight % of $SiO_2$, 1 to 10 weight % of $Al_2O_3$ and 1 to 10 weight % of $B_2O_3$.
12. The resistor composition in accordance with claim 2, wherein the anorthite has a BET surface of approximately 10 to 20 m²/g; the pyrochlore-related oxide is selected from the group consisting of $Ba_{0.6}Cu_{0.3}Pb_{0.6}Bi_{0.5}Ru_2O_{7-z}$, $Ca_{0.85}Cu_{0.25}Pb_{0.5}Bi_{0.4}Ru_2O_{7-z}$ and $Ca_{0.8}PB_{0.8}Bi_{0.4}Ru_2O_{7-z}$; and the glass frit is selected from the group consisting of a lead aluminosilicate glass frit and a lead aluminoborosilicate glass frit.
13. The resistor composition in accordance with claim 1, wherein the pyrochlore-related oxide is $Ba_{0.6}Cy_{0.3}Pb_{0.6}Bi_{0.5}Ru_2O_{7-z}$ and is present in an amount of 31 weight % the glass frit consists essentially of 62 weight % PbO, 29 weight % $SiO_2$, 6 weight % $Al_2O_3$ and 3 weight % CdO and is present in an amount of 60.4 weight %; and the anorthite has a mean particle size of 0.9 micrometers, a BET surface of 13.5 m²/g and is present in an amount of 8.6 weight %.
14. The resistor composition in accordance with claim 1, wherein the pyrochlore-related oxide is $Ba_0$-

$6Cu_{0.3}Pb_{0.6}Bi_{0.5}Ru_2O_{7-z}$ and is present in an amount of 33 weight %; the glass frit consists essentially of 57 weight % PbO, 38 weight % $SiO_2$ and 5 weight % $Al_2O_3$ and the glass frit is present in an amount of 60.8 weight %; and the anorthite is present in an amount of 6.2 weight %.

15. The resistor composition in accordance with claim 1, wherein the pyrochlore-related oxide is $Ca_{0.8}Pb_{0.8}Bi_{0.4}Ru_2O_{7-z}$ and is present in an amount of 28 weight %; the glass frit consists essentially of 63 weight % PbO, 31 weight % $SiO_2$, 4 weight % $Al_2O_3$ and 2 weight % $B_2O_3$ and the glass frit is present in an amount of 60 weight %; and the anorthite is present in an amount of 12.0 weight %.

16. The resistor composition in accordance with claim 1, wherein the pyrochlore-related oxide is $Ca_{0.85}Cu_{0.25}Pb_{0.5}Bi_{0.4}Ru_2O_{7-z}$ and is present in an amount of 28 weight %; the glass frit consists essentially of 63 weight % PbO, 31 weight % $SiO_2$, 4 weight % $Al_2O_3$ and 2 weight % $B_2O_3$ and the glass frit is present in an amount of 61.9 weight %; and the anorthite is present in an amount of 10.1 weight %.

17. The resistor composition in accordance with claim 1, wherein the pyrochlore-related oxide is $Ca_{0.8}Pb_{0.8}Bi_{0.4}Ru_2O_{7-z}$ and is present in an amount of 19 weight %; the glass frit consists essentakilly of 63 weight % PbO, 31 weight % $SiO_2$, 4 weight % $Al_2O_3$ and 2 weight % $B_2O_3$ and the glass frit is present in an amount of 73.8 weight %; and the anorthite is present in an amount of 7.2 weight %.

18. The resistor composition in accordance with claim 1, wherein the pyrochlore-related oxide is $Ca_{0.85}Cu_{0.25}Pb_{0.5}Bi_{0.4}Ru_2O_{7-z}$ and is present in an amount of 25 weight %; the glass frit consists essentially of 63 weight % PbO, 31 weight % $SiO_2$, 4 weight % $Al_2O_3$ and 2 weight % $B_2O_3$ and is present in an amount of 61.8 weight %; and the anorthite is present in an amount of 13.2 weight %.

19. The resistor composition in accordance with claim 1, wherein the pyrochlore-related oxide is $Ba_{0.6}Cu_{0.3}Pb_{0.6}Bi_{0.5}Ru_2O_{7-z}$ and is present in an amount of 28 weight %; the glass frit consists essentially of 62 weight % PbO, 29 weight % $SiO_2$, 6 weight % $Al_2O_3$ and 3 weight % CdO and the glass frit is present in an amount of 60.3 weight %; and the anorthite is present in an amount of 11.7 weight %.

20. A paste comprising the resistor composition in accordance with claim 1 in combination with an organic medium.

21. The paste in accordance with claim 20, wherein the organic medium is a solution of an organic polymer selected from the group consisting of acrylic resin and ethyl cellulose, in an organic solvent selected from the group consisting of terpineol and butylcarbitol.

* * * * *